(12) United States Patent
Fukui et al.

(10) Patent No.: US 7,334,829 B2
(45) Date of Patent: Feb. 26, 2008

(54) VEHICLE SEAT LIFT SPEED VARIABLE SWITCH SYSTEM

(75) Inventors: Osamu Fukui, Naka-gun (JP); Kiyoto Watanabe, Ebina (JP)

(73) Assignee: Autech Japan, Inc., Kanagawa (JP)

( * ) Notice: Subject to any disclaimer, the term of this patent is extended or adjusted under 35 U.S.C. 154(b) by 0 days.

(21) Appl. No.: 11/687,241

(22) Filed: Mar. 16, 2007

(65) Prior Publication Data
US 2007/0221429 A1    Sep. 27, 2007

(30) Foreign Application Priority Data
Mar. 24, 2006    (JP) .............................. 2006-083670

(51) Int. Cl.
*B60N 2/02* (2006.01)
(52) U.S. Cl. .................. 296/65.11; 297/344.2
(58) Field of Classification Search ............ 296/65.01, 296/65.11, 65.12; 297/344.2, 344.11, 344.03
See application file for complete search history.

(56) References Cited

U.S. PATENT DOCUMENTS 5,524,952 A * 6/1996 Czech et al. ............. 296/65.12
6,024,398 A * 2/2000 Horton et al. ........... 296/65.07
6,557,919 B2 * 5/2003 Suga et al. ............... 296/65.07

FOREIGN PATENT DOCUMENTS

JP    2005-306322    11/2005

* cited by examiner

*Primary Examiner*—Joseph D Pape
(74) *Attorney, Agent, or Firm*—Global IP Counselors, LLP

(57) ABSTRACT

A vehicle seat lift speed variable switch system basically has a lift-up mechanism, a control unit and an interface. The lift-up mechanism is configured to selectively lower and lift a vehicle seat between a first position inside a vehicle occupant compartment and a second position outside the vehicle occupant compartment. The control unit is configured to control lowering and lifting movements of the vehicle seat via the lift-up mechanism. The interface is configured to transmit a command signal to the control unit. The interface includes a lift switch and a lift speed variable switch. The control unit is further configured to operate the lift-up mechanism to move the vehicle seat at a predetermined speed when an input is received from only the lift switch, and at a different speed from than the predetermined speed when simultaneous inputs are received from the lift speed variable switch and the lift switch.

12 Claims, 8 Drawing Sheets

VEHICLE SEAT LIFT SPEED VARIABLE SWITCH SYSTEM

CROSS-REFERENCE TO RELATED APPLICATIONS

This application claims priority to Japanese Patent Application No. 2006-083670 filed Mar. 24, 2006. The entire disclosure of Japanese Patent Application No. 2006-083670 is hereby incorporated herein by reference.

BACKGROUND OF THE INVENTION

1. Field of the Invention

The present invention generally relates to a vehicle seat lift speed variable switch system for a vehicle seat, which switch is used upon assisting an elderly or handicapped person in getting on or off a vehicle by lowering or lifting a vehicle seat.

2. Background Information

Conventionally, there is proposed a mechanism for angular and linear movement of a vehicle seat. This mechanism can move a vehicle seat seated by a vehicle occupant longitudinally within the vehicle occupant compartment to any desired position, and, it can turn the vehicle seat laterally outward and move it through the vehicle door opening downward to a position outside the vehicle occupant compartment when the vehicle occupant wishes to get off the vehicle.

One example of such a conventional vehicle seat device is disclosed in Japanese Laid Open Patent Publication No. 2005-306322. This conventional vehicle seat device employs a mechanism for moving a vehicle seat longitudinally within a vehicle occupant compartment, a mechanism for turning the vehicle seat through about 90 degrees between a position facing forwardly and a position facing a vehicle door opening, and a lift-up mechanism to move the vehicle seat in the position facing the vehicle door opening downward past the vehicle door opening to a position outside the vehicle occupant compartment.

The vehicle seat devices of this kind are required to lift or lower a vehicle seat comparatively slowly to ensure the safety of the seated vehicle occupant. An improvement in safety and reliability is required in mechanisms because there is need for good care of an elderly or handicapped person.

SUMMARY OF THE INVENTION

The conventional vehicle seat devices that are currently available are generally satisfactory. However, a need remains for improvements in safety and in convenience of such vehicle seat device in view of existing requirements that a vehicle seat be lowered or lifted at an increased speed when it is unoccupied or under bad weather conditions and other requirement that the vehicle seat be lowered or lifted at a decreased speed when conditions of the seated person so require.

An object of the present invention is to provide a vehicle seat lift speed variable switch system that provides improvements in safety and in convenience. The vehicle seat lift speed variable switch system of the present invention ensures selection of a speed at which a vehicle seat is lowered or lifted without causing any error in manipulation and ensures that the vehicle seat is moved at the selected variable speed when the vehicle seat is either lowered or lifted.

In order to accomplish the above-mentioned object, a vehicle lift speed variable switch is provided that basically comprises a lift-up mechanism, a control unit and an interface. The lift-up mechanism is configured to selectively lower and lift a vehicle seat between a first position inside a vehicle occupant compartment and a second position outside the vehicle occupant compartment. The control unit is configured to control lowering and lifting movements of the vehicle seat via the lift-up mechanism. The interface is configured to transmit a command signal to the control unit. The interface includes a lift switch and a lift speed variable switch. The control unit is further configured to operate the lift-up mechanism to move the vehicle seat at a predetermined speed when an input is received from only the lift switch, and at a different speed from than the predetermined speed when simultaneous inputs are received from the lift speed variable switch and the lift switch.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
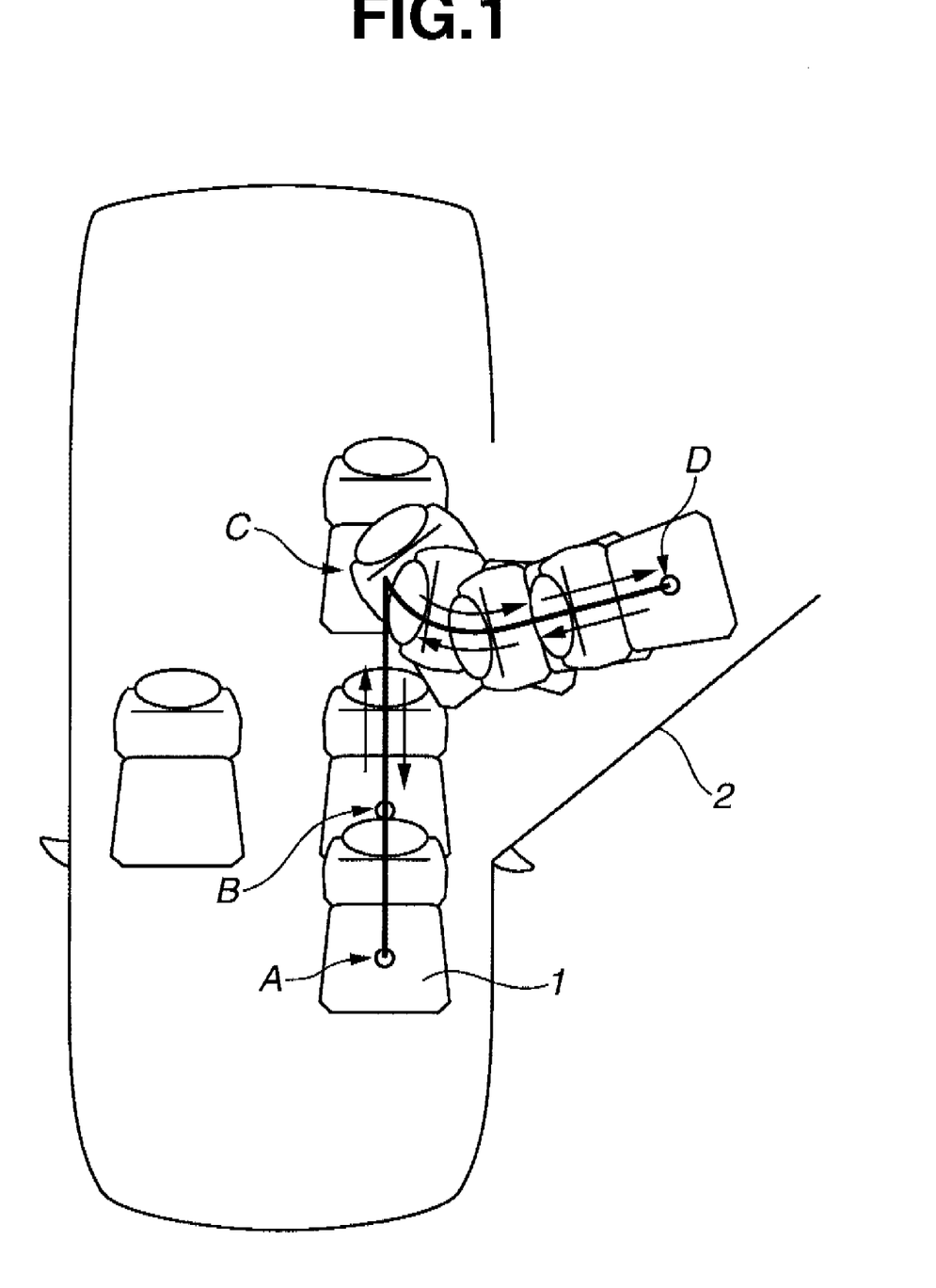
FIG. 1 is a simplified top plan view of a vehicle illustrating movement of a vehicle seat device employing one embodiment of a vehicle seat lift speed variable switch system for a vehicle seat according to one embodiment of the present invention.

Referring initially to FIG. 1, a vehicle seat device is illustrated employing one embodiment of a vehicle seat lift speed variable switch system that is implemented in a front passenger seat. After backward sliding movement of a vehicle seat 1 from a position A to a position C via a position B, the vehicle seat 1 is turned 90 degrees toward an opening covered by a door 2. Next, from the position C, the vehicle seat 1 is moved downward past the opening to a displaced position D outside the vehicle occupant compartment. The vehicle seat 1 in the displaced position D returns to the position inside the vehicle occupant compartment by reversing the order of the positions A to D.

Figure 2:
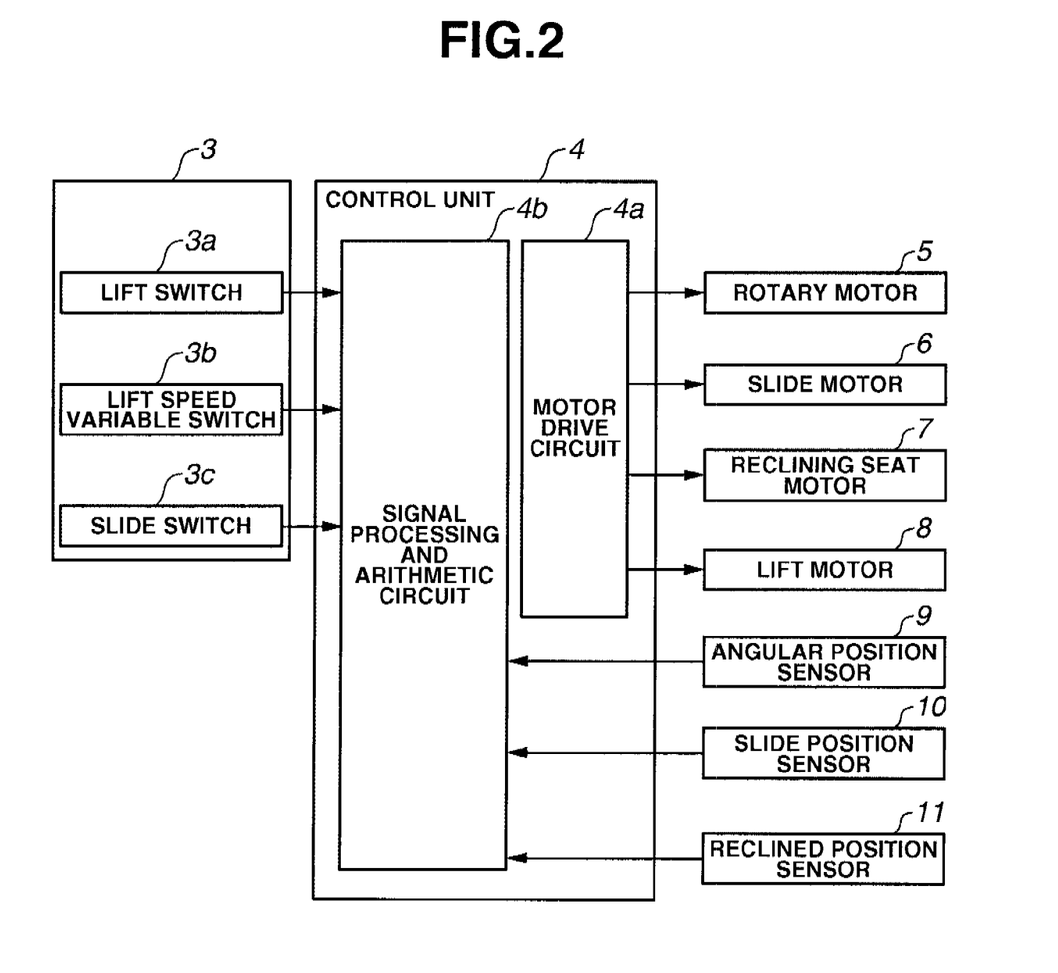
FIG. 2 is a block diagram of the vehicle seat device employing the vehicle seat lift speed variable switch system according to one embodiment of the present invention.

As shown in FIG. 2, the vehicle seat device comprises a control panel 3, a control unit 4, a rotary motor 5, a slide motor 6, a reclining seat motor 7, a lift motor 8, an angular position sensor 9, a slide position sensor 10 and a reclined position sensor 11.

Figure 7:
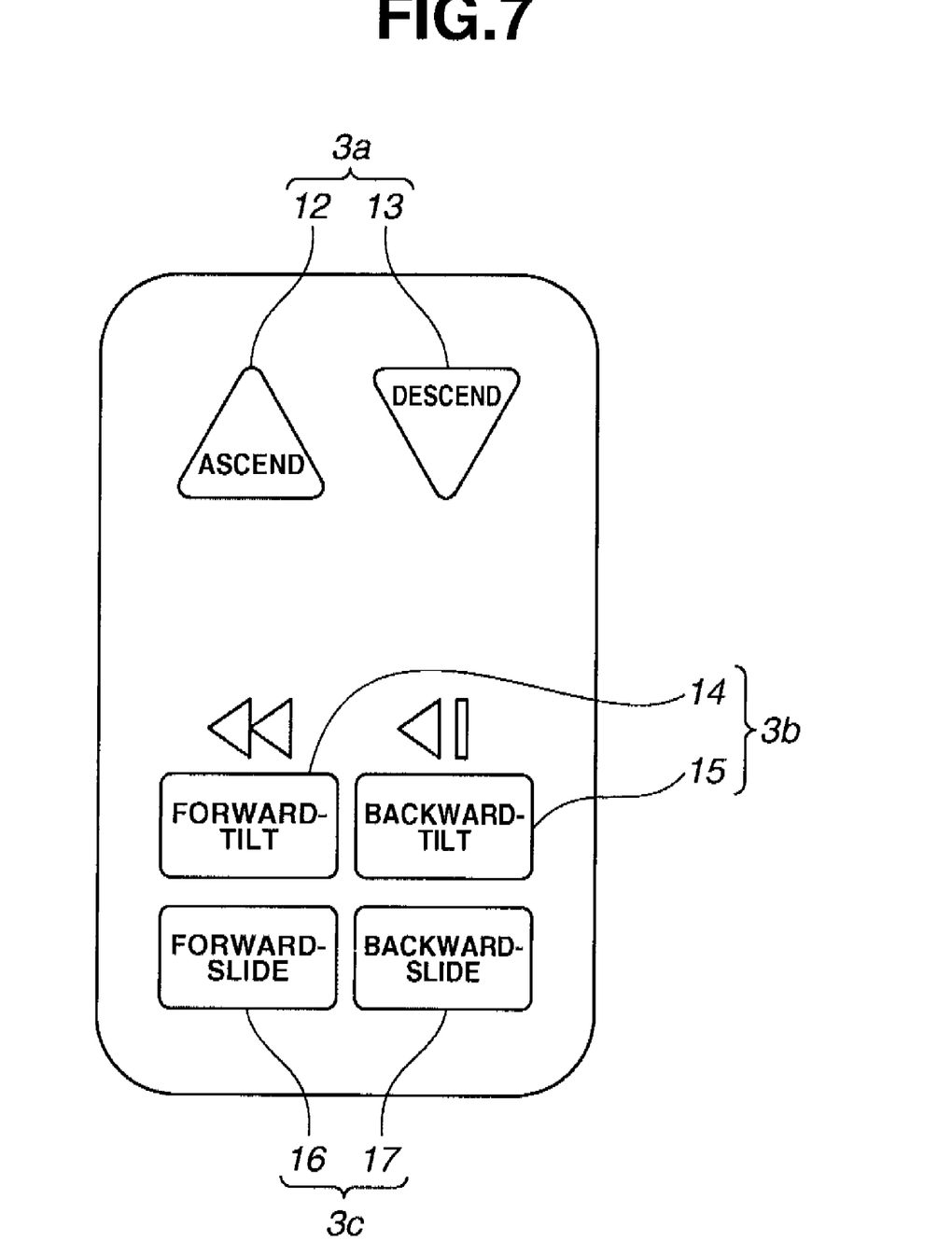
FIG. 7 is a top plan view of a control panel for a control unit utilized in conjunction with the vehicle seat lift speed variable switch system according to one embodiment of the present invention.

As shown in FIGS. 2 and 7, the control panel 3 includes a lift switch 3a, a lift speed variable switch 3b, and a slide switch 3c. The lift switch 3a transmits a command signal to lower the vehicle seat 1 or a command signal to lift the vehicle seat 1 to the control unit 4. The lift speed variable switch 3b serves as a speed adjustment switch to vary a speed at which the vehicle seat 1 is lowered or lifted, and also serves as a backrest adjustment switch to adjust an angle of a backrest 30 as later described. When the lift speed variable switch 3b serves as the speed adjustment switch to vary the lower/lift speed of the vehicle seat 1, the lift speed variable switch 3b transmits a command signal indicating either a high speed movement action of the vehicle seat 1 or a low speed movement action of the vehicle seat 1 to the control 4. When the lift speed variable switch 3b serves as the backrest adjustment switch to adjust the angle of the backrest 30, the lift speed variable switch 3b transmits a command signal indicating either a forward tilting movement action of the backrest 30 or a backward tilting movement action of the backrest 30 to the control unit 4. The slide switch 3c is a switch to adjust the longitudinal position of the vehicle seat 1 within the vehicle occupant compartment and transmits a command signal indicating either a forward longitudinal movement action or a backward longitudinal movement action to the control unit 4.

The rotary motor 5 is operated to rotate in response to receiving a command signal transmitted thereto by a motor drive circuit 4a of the control unit 4. The angular position sensor 9 detects an angular position of the vehicle seat 1. The slide motor 6 is operated to rotate in response to receiving a command signal transmitted thereto by the motor drive circuit 4a. The slide position sensor 10 detects a slide position of the vehicle seat 1. The reclining motor 7 is operated to rotate in response to receiving a command signal transmitted thereto by the motor drive circuit 4a. The relined position sensor 11 detects a reclined angle of the vehicle seat 1. The lift motor 8 is operated to rotate in response to receiving a command signal transmitted thereto by the motor drive circuit 4a in order to assist the seated vehicle occupant getting in or off the vehicle occupant compartment by lifting or lowering the vehicle seat 1 past the opening uncovered by the door 2. A signal processing and arithmetic circuit 4b performs operation processing upon receiving signals from the lift switch 3a, the lift speed variable switch 3b and the slide switch 3c and signals from the angular position sensor 9, the slide position sensor 10 and the reclined position sensor 11. The signal processing and arithmetic circuit 4b then transmits command signals to the motor 5, the slide motor 6, the reclining seat motor 7 and the lift motor 8 via the motor drive circuit 4a.

With regards to the other, there are a slide standard switch that limits a slide width of the vehicle seat 1 and a reclined position standard switch that limits a reclined angle.

Figure 3:
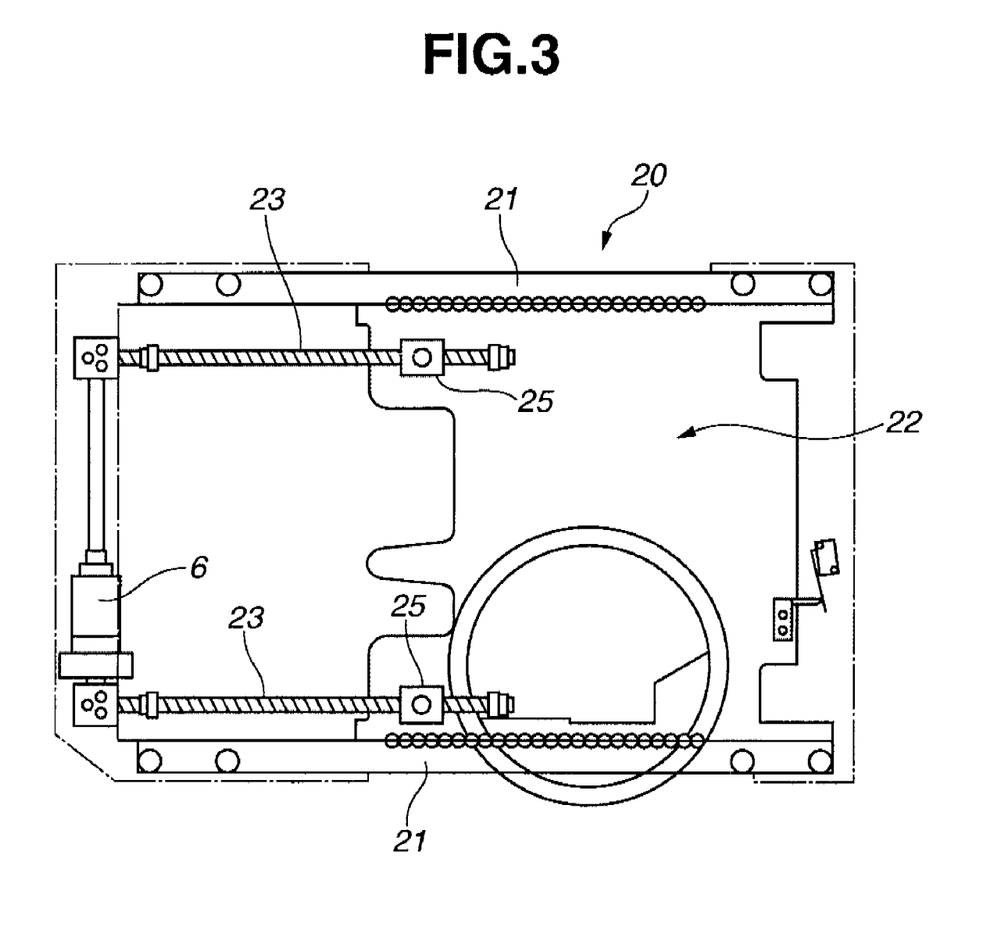
FIG. 3 is a top plan view of a slide mechanism utilized in conjunction with the vehicle seat lift speed variable switch system according to one embodiment of the present invention.

As shown in FIG. 3, a slide mechanism 20 is provided on a floor of the vehicle at near a driver's seat. The slide mechanism 20 has a pair of parallel rails 21, a slide base 22 and a driving device. The parallel rails 21 are fixedly attached on the vehicle floor to extend in a longitudinal direction of the vehicle. The slide base 22 is moveable in the longitudinal direction of the vehicle due to the parallel rails 21. The driving device is disposed between the slide base 22 and the vehicle floor.

The driving device basically includes a pair of parallel ball screws 23 mounted on the vehicle floor, the slide motor 6 for turning the ball screws 23, and a pair of nuts 25 mounted on the slide base 22. The ball screws 23 are threadedly engaged with the nuts 25.

The ball screws 23 revolve when the slide motor 6 rotates. The revolution of the ball screws 23 causes the nuts 25 and the slide base 22 to move longitudinally. Thus, the rotation mechanism 26, the lift-up mechanism 34 and the vehicle seat 1 move longitudinally with respect to the vehicle.

Figure 4:
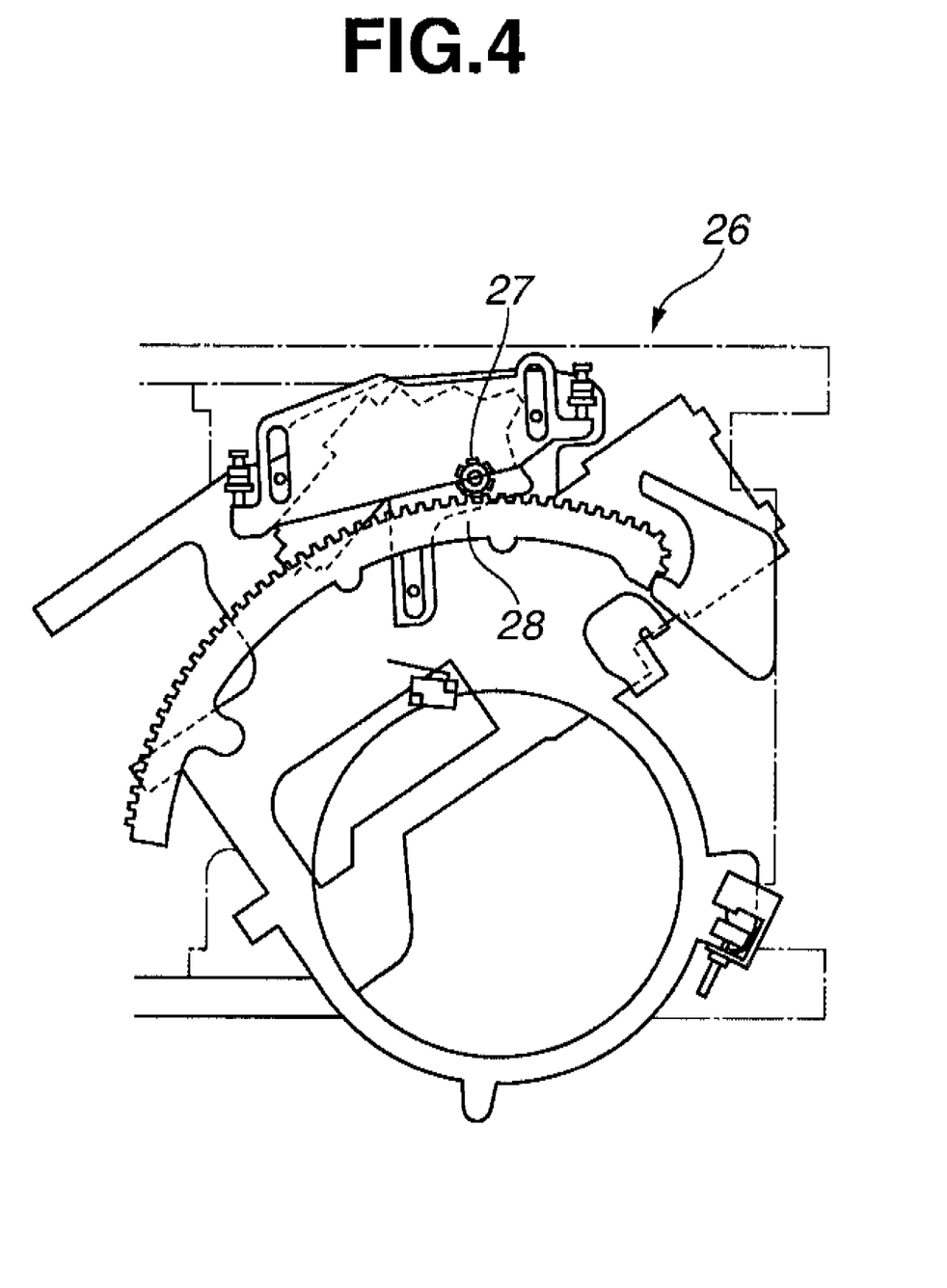
FIG. 4 is a top plan view of a rotation mechanism utilized in conjunction with the vehicle seat lift speed variable switch system according to one embodiment of the present invention.

As shown in FIG. 4, the rotation mechanism 26 is mounted on the slide base 22. This rotation mechanism 26 includes a pinion 27 and an arc-shaped gear 28. The pinion 27 meshes with the arc-shaped gear 28.

The pinion 27 is mounted on the slide base 22. The arc-shaped gear 28 has mounted on its upper side a rotary base. The pinion 27 is fixedly coupled with an output shaft of the rotary motor 5. When the rotary motor 5 rotates, the arc-shaped shaped gear 28 rotates, causing the lift-up mechanism 34 and the vehicle seat 1 to turn.

Therefore, the vehicle seat 1 can move longitudinally along the slide rails 21 by the slide mechanism 20 and the rotation mechanism 26, and the vehicle seat 1 can turn to shift from a state in which it faces forwardly to a state in which it faces the door opening by activating the rotary motor 5.

Figure 5:
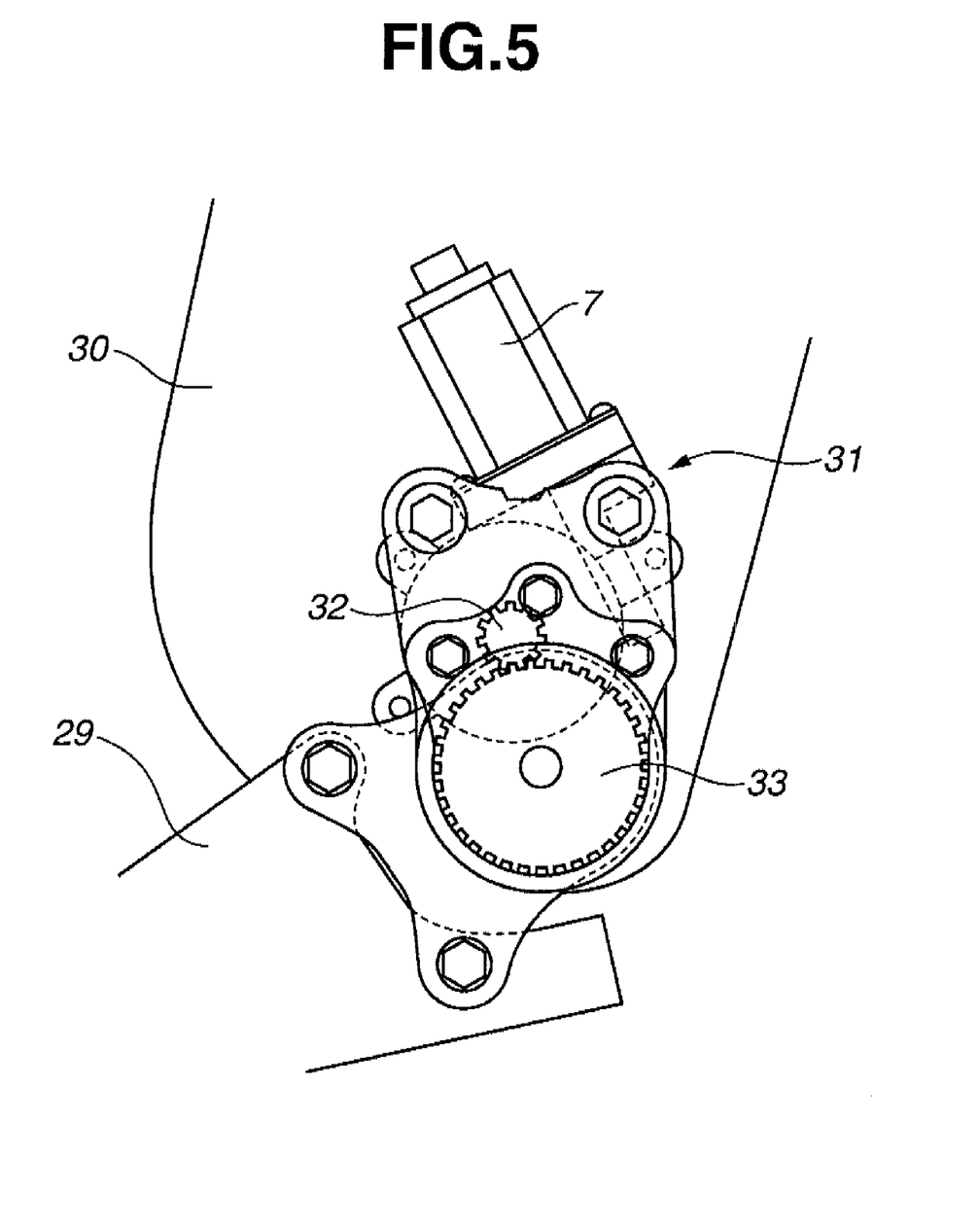
FIG. 5 is a front side elevational view of a reclining mechanism utilized in conjunction with the vehicle seat lift speed variable switch system according to one embodiment of the present invention.
Figure 6A:
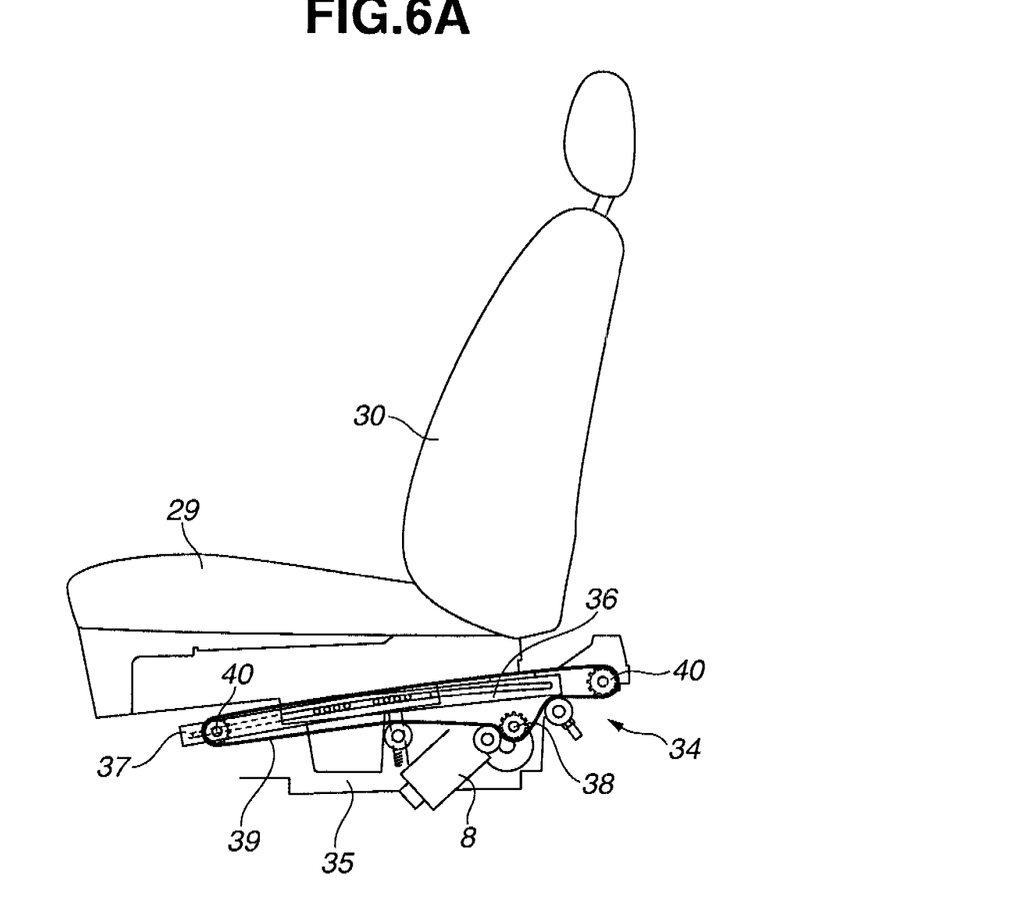
FIG. 6A is a front side elevational view of a lift-up mechanism in an initial position utilized in conjunction with the vehicle seat lift speed variable switch system according to one embodiment of the present invention.

As shown in FIG. 5 and FIG. 6A, the vehicle seat 1 includes a seat cushion 29, a backrest 30, and a headrest. The backrest 30 can tilt backwardly to take at least one reclined positions.

As shown in FIG. 5, a reclining mechanism 31 is provided that includes a reclining motor 7. In response to a signal from the control unit 4, a driving gear 32 turns to change its engagement position with an immovable gear 33 to adjust an angle of tilt of the backrest 30.

Figure 6B:
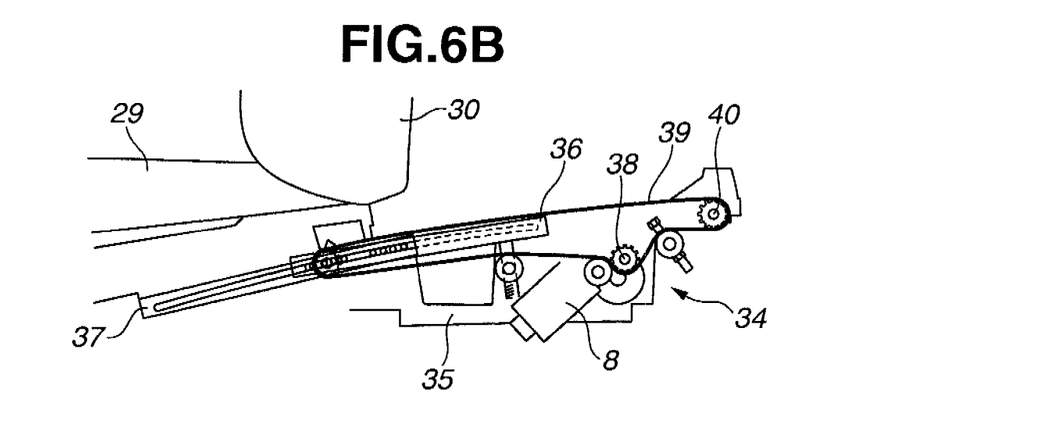
FIG. 6B is a front side elevational view of the lift-up mechanism in a displaced position utilized in conjunction with the vehicle seat lift speed variable switch system according to one embodiment of the present invention.

As shown in FIGS. 6A and 613, the lift-up mechanism 34 includes an upper part of a lift-up base 35, an outer lift slide rail 36 and an inner lift slide rail 37. Both of the rails 36 and 37 extend to secure the length in slide and the vertical difference in lift of the seat 1. Both of the rails 36 and 37 employ a driving mechanism that includes a driving pulley 38 that is turned by the lift motor 8, and a pair of follower pulleys 39 and 40 that guide a belt 39. When it turns in a positive rotational direction, the lift motor 8 changes the intermeshing relationship between the pulleys and belt 39 to move the vehicle seat 1 outwardly and downward toward the displaced position outside the vehicle occupant compartment. Subsequently, when it turns in a reverse rotational direction, the lift motor 8 moves the vehicle seat 1 inwardly and upward toward the initial position inside the vehicle occupant compartment from the displaced position.

The slide motor 6 of the slide mechanism 20, the rotary motor 6 of the rotation mechanism 26, and the lift motor 8 of the lift-up mechanism 34 cooperate with each other to move the vehicle seat 1 outwardly to the displaced position and to move it from the displaced position outside the vehicle occupant compartment inwardly to the initial position inside the vehicle occupant compartment.

Each of the above-mentioned motors 5 to 8 is an electric motor so that a speed of movement of the associated mechanism to the motor can be set by regulating a speed of rotation of the motor. The speed of rotation of a motor can be varied by carrying out PWM drive of the motor and changing the duty ratio or by setting a third brush and varying the number of windings of each electric core of the motor, which technique is used as a mechanism for a wiper motor.

As shown in FIG. 7, the control panel 3 is designed as one that can be arranged inside the vehicle occupant compartment or near the vehicle seat 1. It can be designed as a wire connected or wireless remote controller. The control panel 3 has the lift switch 3a, the lift speed variable switch 3b and the slide switch 3c arranged in this order vertically, with the lift switch 3a, the ascending switch 12 and the descending switch 13 arranged side-by-side. The lift speed variable switch 3b includes a high speed switch 14 and a low speed switch 15 that are arranged side-by-side. The slide switch 3c includes a forward-slide switch 16 and a backward-slide switch 17 that are arranged side-by-side. In this embodiment, each of the switches 12 to 17 transmits a command signal to the control unit 4 by electrically connecting a pair of contacts with each other when it is pressed. The switches are not limited to the illustrated example. The shape and/or structure of each of the switches 12 to 17 may be appropriately set.

In the following, there is description of control of lift speed of the vehicle seat 1 carried out by the control unit 4. Firstly, referring to the flow chart illustrated in FIG. 8, there is description of descending speed determination processing to be carried out when the vehicle seat 1 lies inside the vehicle occupant compartment.

Figure 8:
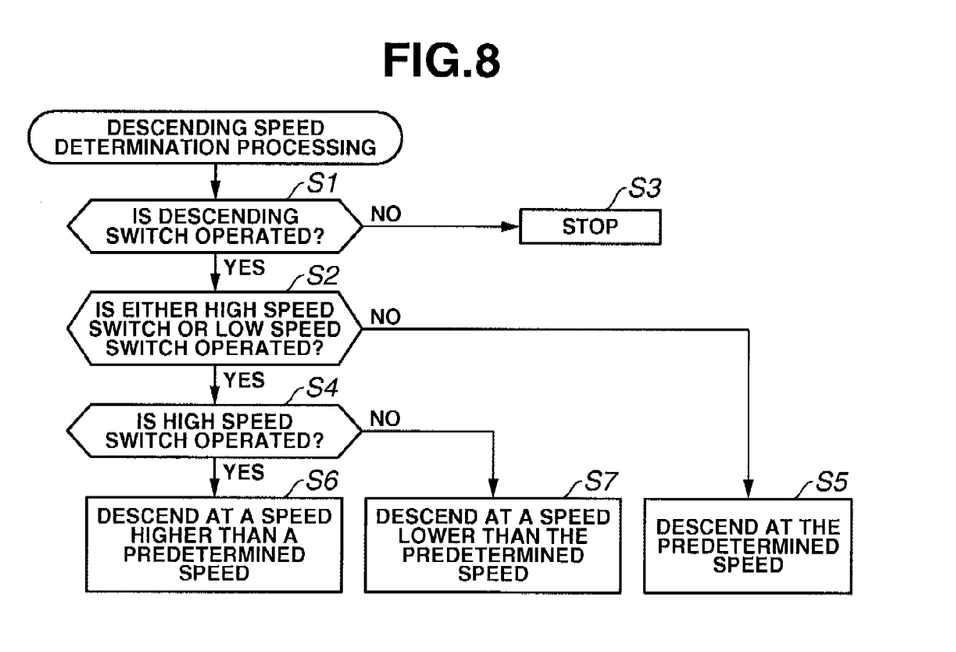
FIG. 8 is a flow chart illustrating a descending speed determination processing carried out by the control unit utilized in conjunction with the vehicle seat lift speed variable switch system according to one embodiment of the present invention.

In step S1, the control unit 4 determines whether or not there is an input from the descending switch 13. If this is the case, then the control proceeds to step S2, and if this is not the case, then the control proceeds to step S3 in which the control unit 4 stops movement of the vehicle seat 1.

In step S2, the control unit 4 determines whether or not there is an input from any one of the high speed switch 14 and the low speed switch 15. If this is the case, then the control proceeds to step S4, and if this is not the case, then the control proceeds to step S5 in which the control unit 4 descends or lowers the vehicle seat 1 at a predetermined descending speed (for example, 15 cm/second).

In step S4, the control unit 4 determines whether or not there is an input from the high speed switch 14. If this is the case, then the control proceeds to step S6 in which the control unit 4 descends or lowers the vehicle seat 1 at a speed (for example, 20 cm/second) higher than the predetermined descending speed. If this is not the case, then the control proceeds to step S7 in which the control unit 4 descends or lowers the vehicle seat 1 at a speed (for example, 10 cm/second) lower than the predetermined descending speed.

Figure 9:
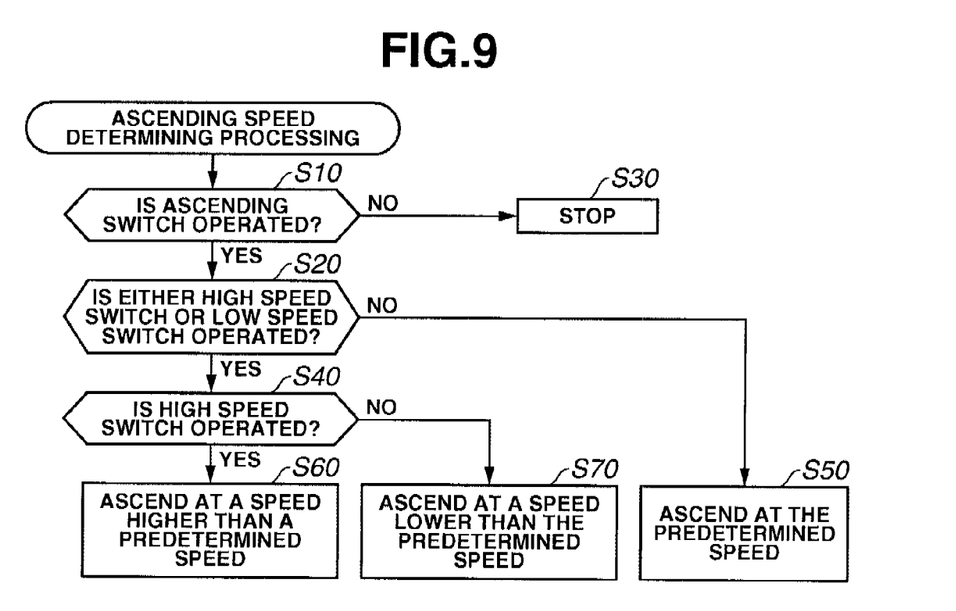
FIG. 9 is a flow chart illustrating an ascending speed determination processing carried out by the control unit utilized in conjunction with the vehicle seat lift speed variable switch system according to one embodiment of the present invention.

Next, referring to the flowchart illustrated in FIG. 9, there is description of ascending speed determination processing to be carried out when the vehicle seat 1 lies outside the vehicle occupant compartment. In step S10, the control unit 4 determines whether or not there is an input from the ascending switch 12. If this is the case, then the control proceeds to step S20, and if this is not the case, then the control proceeds to step S30 in which the control unit 4 stops movement of the vehicle seat 1.

In step S20, the control unit 4 determines whether or not there is an input from any one of the high speed switch 14 and the low speed switch 15. If this is the case, then the control proceeds to step S40, and if this is not the case, then the control proceeds to step S50 in which the control unit 4 ascends or lifts the vehicle seat 1 at a predetermined ascending speed (for example, 15 cm/second).

In step S40, the control unit 4 determines whether or not there is an input from the high speed switch 14. If this is the case, then the control proceeds to step S60 in which the control unit 4 ascends or lifts the vehicle seat 1 at a speed (for example, 20 cm/second) higher than the predetermined ascending speed. If this is not the case, then the control proceeds to step S70 in which the control unit 4 ascends or lifts the vehicle seat 1 at a speed (for example, 10 cm/second) lower than the predetermined descending speed. The descending and ascending speeds are not limited to this example and can be appropriately set.

Next, there is description of operation of the embodiment. According to the vehicle seat device previously constructed, as shown in FIG. 1, when the vehicle seat 1 lies inside the vehicle occupant compartment and an operator presses the backward-slide switch 17, the vehicle seat 1 moves backwardly from the position A to the position C.

Next, when the operator presses only the descending switch 13, the control unit 4 carries out jobs in FIG. 8 (step S1→step S2→step S5). As a result, the vehicle seat 1 descends downward at the predetermined descending speed from the position C to the position D at the same time it is turning through about 90 degrees. The vehicle seat 1 can turn through about 90 degrees before leaving the position C and then it can descend downward.

On the other hands, when the operator presses either the high speed switch 14 or the low speed switch 15 at the same time when the operator presses the descending switch 13, then the vehicle seat 1 descends downward at a speed higher than the predetermined descending speed (step S1→step S2→step S4→step S6 in FIG. 8) or at a speed lower than the predetermined descending speed (step S1→step S2→step S4→step S7 in FIG. 8) from the position C to the position D at the same time it is turning through about 90 degrees toward outside the vehicle. In this case, the vehicle seat 1 is prevented from descending downward at the speed higher or lower than the predetermined descending speed against the operator's intention unless the operator presses the high speed switch 14 or the low speed switch 15 at the same time when the operator presses the descending switch 13. Furthermore, movement of the vehicle seat 1 stops unless the descending switch 13 is pressed (step S11→step S3 in FIG. 8).

Next, when the vehicle seat 1 lies outside the vehicle occupant compartment and the operator presses only the ascending switch 12, the control unit 4 carries out jobs in FIG. 9 (step S10→step S20→step S50). As a result, the vehicle seat 1 ascends upward at the predetermined descending speed from the position D to the position C at the same time it is turning through about 90 degrees inside the vehicle. The vehicle seat 1 can turn through about 90 degrees forwardly after ascending near the position C.

Next, when the operator presses the forward-slide switch 16, the vehicle seat 1 moves forwardly from the position C to the position A.

On the other hands, when the operator presses the high speed switch 14 or the low speed switch 15 at the same time when the operator presses the ascending switch 12, the vehicle seat 1 ascends upward either at a speed higher than the predetermined descending speed (step S10→step S20→step S40→step S60 in FIG. 9) or at a speed lower than the predetermined descending speed (step S10→step S20→step S40→step S70 in FIG. 9) from the position D to the position C at the same time it is turning through about 90 degrees inside the vehicle occupant compartment. In this case, the vehicle seat 1 is prevented from ascending upward at the speed higher or lower than the predetermined ascending speed against the operator's intention unless the operator presses the high speed switch 14 or the low speed switch 15 at the same time when the operator presses the ascending switch 12. Furthermore, movement of the vehicle seat 1 stops unless the ascending switch 12 is pressed (step S10→step S30 in FIG. 9).

In addition, when the seated vehicle occupant within the vehicle seat 1 presses only the high speed switch 14 or the low speed switch 15, the backrest 30 tilts forwardly or backwardly. The high speed switch 14 serves as a forward-tilt switch for the backrest 30, and the low speed switch 15 serves as a backward-tilt switch for the backrest 30. Of course, it will be apparent to those skilled in the art from this disclosure that the high speed switch 14 and the low speed switch 15 can be used for other mechanism as needed and/or desired.

The combinations between each of switches 12 to 15 being operated and the speeds at which the vehicle seat 1 descends and ascends are tabulated in Table 1, as seen below, at switch actions A1 to A6. The action taken when the operator presses only the high speed switch 14 or the low speed switch 16 is as described.

TABLE 1

| switch | ascend | descend | f.tilt(high) | r.tilt(low) | action |
|---|---|---|---|---|---|
| A1 | input | | | | pre.speed |
| A2 | | input | | | pre.speed |
| A3 | input | | input | | higher |
| A4 | | input | input | | higher |
| A5 | input | | | input | lower |
| A6 | | input | | input | lower |

When the operator performs operation A1 or A2, the vehicle seat 1 with seated occupant moves up or down at the predetermined speed with safety ensured. On the other hands, when the vehicle seat 1 is unoccupied or under bad weather conditions, the vehicle speed 1 is moved at the speed higher than the predetermined speed with the convenience ensured.

Care for the seated vehicle occupant can be made by moving the vehicle seat 1 up or down at the speed lower than the predetermined speed by performing operation A5 or A6. Of course, the above-listed operations A1 to A6 can be used for any other appropriate missions.

Next, there is description on the technical effects. As previously described, the vehicle seat lift speed variable switch system according to the present invention basically comprises the lift-up mechanism 34, the control unit 4 and the interface 3. The lift-up mechanism 34 lowers or lifts a vehicle seat 1 between a first position inside a vehicle occupant compartment and a second position outside the vehicle occupant compartment. The control unit 4 controls lowering and lifting movements of the vehicle seat 1 via the lift-up mechanism 34. The n interface 3 transmits a command signal to the control unit 4. The interface 3 including the ascend switch 12, the descend switch 13, the high speed switch 14 and the low speed switch 15. The control unit 4 is further configured to operate the lift-up mechanism 34 to lift the vehicle seat 1 at a predetermined ascending speed when an input is received from only the ascend switch 12. The control unit 4 is further configured to operate the lift-up mechanism 34 to lift the vehicle seat 1 at a high speed that is higher than the predetermined ascending speed when simultaneous inputs are received from the high speed switch 14 and the ascend switch 12. The control unit 4 is further configured to operate the lift-up mechanism 34 to lift the vehicle seat 1 at a low speed that is lower than the predetermined ascending speed when simultaneous inputs are received from the low speed switch 15 and the ascend switch 12. The control unit 4 is further configured to operate the lift-up mechanism 34 to lower the vehicle seat 1 at a predetermined descending speed when an input is received from only the descend switch 13. The control unit 4 is further configured to operate the lift-up mechanism 34 to lower the vehicle seat 1 at a high speed that is higher than the predetermined descending speed when simultaneous inputs are received from the high speed switch 14 and the descend switch 13. The control unit 4 is further configured to operate the lift-up mechanism 34 to lower the vehicle seat 1 at a low speed that is lower than the predetermined descending speed when simultaneous inputs are received from the low speed switch 15 and the descend switch 13.

The lift speed variable switch system constructed as above provides improvements in safety and in convenience by allowing selection of a desired ascending/descending speed without any false operation as well as varying the ascending speed and descending speed of the vehicle seat 1.

In addition, in the lift speed variable switch system, the high speed switch 14 and the low speed switch 15 of the interface 3 are arranged adjacent to each other (see FIG. 7), and when there is an input from only selected one of the high speed and low speed switches 14 and 15, the control unit 4 controls that one of a pair of movements, i.e., a forward-tilt movement and a backward-tilt movement, of a predetermined mechanism, i.e., a reclining mechanism 31, set beforehand for the high and low speed switches 14 and 15 which is set for the selected one speed switch 14 or 15. In other words, when there is an input from the high speed switch 14, the control unit 4 controls the forward-tilt movement of the reclining mechanism 31. On the other hands, when there is an input from the low speed switch 15, the control unit 4 controls the backward-tilt movement of the reclining mechanism 31. In the lift speed variable switch system, the high speed switch 14 and the low speed switch 15 serve as switches for forward-tilt movement and backward-tilt movement of the reclining mechanism 31, reducing the number of switches on the interface 3 to advance the plan toward miniaturization.

Selecting the adjacent two high and low speed switches 14 and 15 to serve as a pair of movements of a predetermined mechanism provides better operability than selecting the switches that are not closely related to each other.

In the preceding description, the present invention has been described in connection with the implementation, but not limited to it. The present invention may contain any design modifications within a range not deviated from the sprint of the subject matter. For example, the present invention may take any appropriate setting of concrete values of the ascending and descending speeds of the vehicle seat 1.

In addition, the high and low speed switches 14 and 15 can serve as switches not only for forward-tilt and backward-tilt movements of the reclining mechanism 31, but also for movements of other mechanism.

Furthermore, speed control of pivotal movement of the vehicle seat 1 and speed control of sliding movement thereof may be connected with speed control of lift speed of the vehicle seat 1.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

While only selected embodiments have been chosen to illustrate the present invention, it will be apparent to those skilled in the art from this disclosure that various changes and modifications can be made herein without departing from the scope of the invention as defined in the appended claims. For example, the functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat lift speed variable switch system comprising:
   a lift-up mechanism configured to selectively lower and lift a vehicle seat between a first position inside a vehicle occupant compartment and a second position outside the vehicle occupant compartment;
   a control unit configured to control lowering and lifting movements of the vehicle seat via the lift-up mechanism; and
   an interface configured to transmit a command signal to the control unit, the interface including a lift switch and a lift speed variable switch;
   the control unit being further configured to operate the lift-up mechanism to move the vehicle seat
      at a predetermined speed when an input is received from only the lift switch, and
      at a different speed from than the predetermined speed when simultaneous inputs are received from the lift speed variable switch and the lift switch.

2. The vehicle seat lift speed variable switch system as recited in claim 1, wherein
   the lift switch is an ascend switch that signals the control unit to perform a lifting operation.

3. The vehicle seat lift speed variable switch system as recited in claim 2, wherein
   the lift speed variable switch is a high speed switch that signals the control unit to operate the lift-up mechanism at a high speed that is higher than the predetermined speed when the lift speed variable switch and the lift switch are simultaneously operated.

4. The vehicle seat lift speed variable switch system as recited in claim 2, wherein
   the lift speed variable switch is a low speed switch that signals the control unit to operate the lift-up mechanism at a low speed that is lower than the predetermined speed when the lift speed variable switch and the lift switch are simultaneously operated.

5. The vehicle seat lift speed variable switch system as recited in claim 1, wherein
   the lift switch is a descend switch that signals the control unit to perform a lowering operation.

6. The vehicle seat lift speed variable switch system as recited in claim 5, wherein
   the lift speed variable switch is a high speed switch that signals the control unit to operate the lift-up mechanism at a high speed that is higher than the predetermined speed when the lift speed variable switch and the lift switch are simultaneously operated.

7. The vehicle seat lift speed variable switch system as recited in claim 5, wherein
   the lift speed variable switch is a low speed switch that signals the control unit to operate the lift-up mechanism at a low speed that is lower than the predetermined speed when the lift speed variable switch and the lift switch are simultaneously operated.

8. The vehicle seat lift speed variable switch system as recited in claim 1, wherein
   the lift speed variable switch is a high speed switch that signals the control unit to operate the lift-up mechanism at a high speed that is higher than the predetermined speed when the lift speed variable switch and the lift switch are simultaneously operated.

9. The vehicle seat lift speed variable switch system as recited in claim 1, wherein
   the lift speed variable switch is a low speed switch that signals the control unit to operate the lift-up mechanism at a low speed that is lower than the predetermined speed when the lift speed variable switch and the lift switch are simultaneously operated.

10. A vehicle seat lift speed variable switch system comprising:
    a lift-up mechanism configured to selectively lower and lift a vehicle seat between a first position inside a vehicle occupant compartment and a second position outside the vehicle occupant compartment;

a control unit configured to control lowering and lifting movements of the vehicle seat via the lift-up mechanism; and an interface configured to transmit a command signal to the control unit, the interface including an ascend switch, a descend switch, a high speed switch and a low speed switch;

the control unit being further configured to operate the lift-up mechanism to lift the vehicle seat
- at a predetermined ascending speed when an input is received from only the ascend switch,
- at a high speed that is higher than the predetermined ascending speed when simultaneous inputs are received from the high speed switch and the ascend switch, and
- at a low speed that is lower than the predetermined ascending speed when simultaneous inputs are received from the low speed switch and the ascend switch, the control unit being further configured to operate the lift-up mechanism to lower the vehicle seat
- at a predetermined descending speed when an input is received from only the descend switch,
- at a high speed that is higher than the predetermined descending speed when simultaneous inputs are received from the high speed switch and the descend switch, and
- at a low speed that is lower than the predetermined descending speed when simultaneous inputs are received from the low speed switch and the descend switch.

11. The vehicle seat lift speed variable switch system as recited in claim 10, wherein the high speed switch and the low speed switch of the interface are arranged adjacent to each other, and the control unit is configured to control one of a pair of movements of a predetermined mechanism set beforehand for each of the high and low speed switches when an input is received from only one of the high speed and low speed switches.

12. A vehicle seat lift speed variable switch system comprising:

lift-up means for selectively lowering and lifting a vehicle seat between a first position inside a vehicle occupant compartment and a second position outside the vehicle occupant compartment;

control unit means for controlling the lowering and lifting of the vehicle seat via the lift-up mechanism; and user interface means for transmitting a command signal to the control means, the user interface means including lift switch means for signaling at least one of the lowering and lifting of the vehicle seat at a predetermined speed and lift speed variable switch means for signaling at least one of an ascending speed and a descending speed such that the control unit means operates the lift-up means to move the vehicle seat
- at a predetermined speed when only the lift switch means is operated, and
- at a different speed from than the predetermined speed when the lift speed variable switch means and the lift switch means are simultaneously operated.

* * * * *